(12) United States Patent
Nakamura et al.

(10) Patent No.: US 11,741,989 B2
(45) Date of Patent: Aug. 29, 2023

(54) NON-VERBAL UTTERANCE DETECTION APPARATUS, NON-VERBAL UTTERANCE DETECTION METHOD, AND PROGRAM

(71) Applicant: NIPPON TELEGRAPH AND TELEPHONE CORPORATION, Tokyo (JP)

(72) Inventors: Takashi Nakamura, Tokyo (JP); Takaaki Fukutomi, Tokyo (JP); Kiyoaki Matsui, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 142 days.

(21) Appl. No.: 17/293,021

(22) PCT Filed: Oct. 31, 2019

(86) PCT No.: PCT/JP2019/042739
§ 371 (c)(1),
(2) Date: May 11, 2021

(87) PCT Pub. No.: WO2020/100606
PCT Pub. Date: May 22, 2020

(65) Prior Publication Data
US 2021/0272587 A1 Sep. 2, 2021

(30) Foreign Application Priority Data
Nov. 13, 2018 (JP) ................................. 2018-212666

(51) Int. Cl.
*G10L 25/93* (2013.01)
*G10L 25/24* (2013.01)
(Continued)

(52) U.S. Cl.
CPC ................. *G10L 25/93* (2013.01); *G06N 3/02* (2013.01); *G10L 25/24* (2013.01); *G10L 25/30* (2013.01); *G10L 25/51* (2013.01)

(58) Field of Classification Search
CPC ......... G10L 25/93; G10L 25/24; G10L 25/30; G10L 25/51; G10L 25/84; G10L 15/16;
(Continued)

(56) References Cited

U.S. PATENT DOCUMENTS

2017/0160813 A1\* 6/2017 Divakaran ............. G06N 5/022
2018/0012120 A1\* 1/2018 Daniel ................... G06N 3/086
(Continued)

OTHER PUBLICATIONS

Cosentino et al. (2016) "Quantitative Laughter Detection, Measurement, and Classification—A Critical Survey" IEEE Reviews in Biomedical Engineering, vol. 9, pp. 148-162.
(Continued)

*Primary Examiner* — Fariba Sirjani

(57) ABSTRACT

Detection precision of a non-verbal sound is improved. An acoustic model storage unit 10A stores an acoustic model that is configured by a deep neural network with a bottleneck structure, and estimates a phoneme state from a sound feature value. A non-verbal sound model storage unit 10B stores a non-verbal sound model that estimates a posterior probability of a non-verbal sound likeliness from the sound feature value and a bottleneck feature value. A sound feature value extraction unit 11 extracts a sound feature value from an input sound signal. A bottleneck feature value estimation unit 12 inputs the sound feature value to the acoustic model and obtains an output of a bottleneck layer of the acoustic model as a bottleneck feature value. A non-verbal sound detection unit 13 inputs the sound feature value and the bottleneck feature value to the non-verbal sound model and obtains the posterior probability of the non-verbal sound likeliness output by the non-verbal sound model.

20 Claims, 2 Drawing Sheets

(51) Int. Cl.
*G10L 25/30* (2013.01)
*G10L 25/51* (2013.01)
*G06N 3/02* (2006.01)

(58) Field of Classification Search
CPC ........ G06N 3/02; G06N 3/0454; G06N 7/005; G06N 3/0445; G06N 3/08
See application file for complete search history.

(56) References Cited

U.S. PATENT DOCUMENTS

| | | | | |
|---|---|---|---|---|
| 2018/0314689 | A1* | 11/2018 | Wang | G10L 15/1822 |
| 2019/0348064 | A1* | 11/2019 | Lesso | G10L 17/26 |
| 2020/0074997 | A1* | 3/2020 | Jankowski, Jr. | G10L 25/78 |
| 2020/0321008 | A1* | 10/2020 | Wang | G06N 3/08 |

OTHER PUBLICATIONS

Fukuda et al. (2018) "Detecting breathing sounds in realistic Japanese telephone conversations and its application to automatic speech recognition" Speech Communication, vol. 98, pp. 95-103.

Tahon et al. (2015) "Laughter Detection for On-line Human-robot Interaction" Proceedings of the 4th Interdisciplinary Workshop on Laughter and Other Non-verbal Vocalisations in Speech, Apr. 2015, pp. 35-37.

Nandwana et al. (2015) "Robust unsupervised detection of human screams in noisy acoustic environments" 2015 IEEE International Conference on Acoustics, Speech and Signal Processing (ICASSP), Apr. 2015, pp. 161-165.

* cited by examiner

NON-VERBAL UTTERANCE DETECTION APPARATUS, NON-VERBAL UTTERANCE DETECTION METHOD, AND PROGRAM

CROSS-REFERENCE TO RELATED APPLICATIONS

This application is a U.S. 371 Application of International Patent Application No. PCT/JP2019/042739, filed on 31 Oct. 2019, which application claims priority to and the benefit of JP Application No. 2018-212666, filed on 13 Nov. 2018, the disclosures of which are hereby incorporated herein by reference in their entireties.

TECHNICAL FIELD

The present invention relates to a technology for detecting a non-verbal sound from a sound signal (non-verbal sound detection).

BACKGROUND ART

A non-verbal sound is, for example, a nonverbal sound such as a cough, a sneeze, or laughter. NPL 1 discloses various technologies for detecting laughter among non-verbal sounds. NPL 2 discloses a technology for detecting a breathing sound during a telephone conversation in Japanese. NPL 3 discloses a technology for detecting laughter in a dialog between a human being and a robot. NPL 4 discloses a technology for detecting a human scream in a noisy environment.

CITATION LIST

Non Patent Literature

[NPL 1] Sarah Cosentino, Salvatore Sessa, Atsuo Takanishi, "Quantitative Laughter Detection, Measurement, and Classification—A Critical Survey," IEEE Reviews in Biomedical Engineering, Vol. 9, pp. 148 to 162, February 2016.

[NPL 2] Takashi Fukuda, Osamu Ichikawa, Masafumi Nishimura, "Detecting breathing sounds in realistic Japanese telephone conversations and its application to automatic speech recognition," Speech Communication, Vol. 98, pp. 95 to 103, April 2018.

[NPL 3] Marie Tahon, Laurence Devillers, "Laughter Detection for On-line Human-robot Interaction," Proceedings of the 4th Interdisciplinary Workshop on Laughter and Other Non-verbal Vocalisations in Speech, pp. 35 to 37, April 2015.

[NPL 4] Mahesh Kumar Nandwana, Ali Ziaei, John H. L. Hansen, "Robust unsupervised detection of human screams in noisy acoustic environments," 2015 IEEE International Conference on Acoustics, Speech and Signal Processing (ICASSP), pp. 161 to 165, April 2015.

SUMMARY OF THE INVENTION

Technical Problem

Even non-verbal sounds contain sounds which can be transcribed in text (that is, sounds that can mostly be specified as phonemes) in some cases. When a non-verbal sound is considered to be used in sound recognition, such a sound is an important clue. However, in detection of a non-verbal sound in the related art, such sounds have not been used.

An objective of the present invention is to improve detection precision of a non-verbal sound by using information regarding sound content in detection of a non-verbal sound.

Means for Solving the Problem

To solve the foregoing problem, according to an aspect of the present invention, a non-verbal sound detection device includes: an acoustic model storage unit configured to store an acoustic model that is configured by a deep neural network with a bottleneck structure, estimates a phoneme state from an input sound feature value, and outputs the phoneme state; a non-verbal sound model storage unit configured to store a non-verbal sound model that estimates a posterior probability of a non-verbal sound likeliness from the input sound feature value and a bottleneck feature value and outputs the posterior probability; a sound feature value extraction unit configured to extract a sound feature value of each frame from an input sound signal; a bottleneck feature value estimation unit configured to input the sound feature value of each frame extracted from the sound signal to the acoustic model and obtain an output of a bottleneck layer of the acoustic model as a bottleneck feature value of each frame; and a non-verbal sound detection unit configured to input the sound feature value of each frame extracted from the sound signal and the bottleneck feature value of each frame obtained from the sound feature value to the non-verbal sound model and obtain the posterior probability of the non-verbal sound likeliness of each frame output by the non-verbal sound model.

Effects of the Invention

According to the present invention, it is possible to use information regarding sound content in detection of a non-verbal sound and thus improve detection precision of a non-verbal sound.

DESCRIPTION OF EMBODIMENTS

Figure 1:
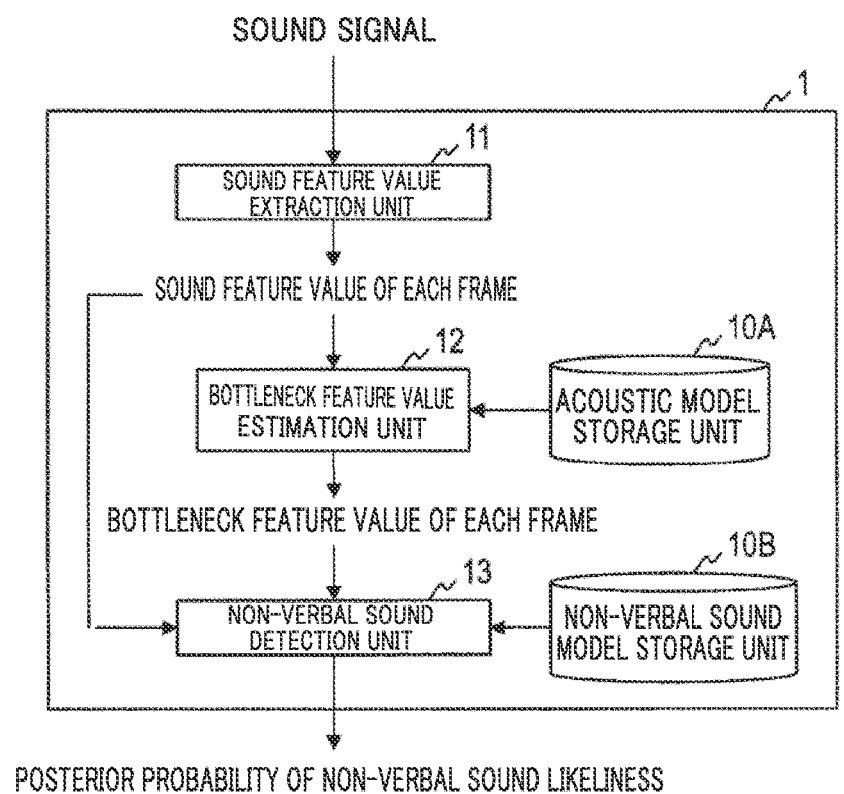
FIG. 1 is a diagram exemplifying a functional configuration of a non-verbal sound detection device.

Hereinafter, embodiments of the present invention will be described in detail. The same reference numerals are given to constituent elements that have the same functions in the drawings and repeated description will be omitted.

Figure 2:
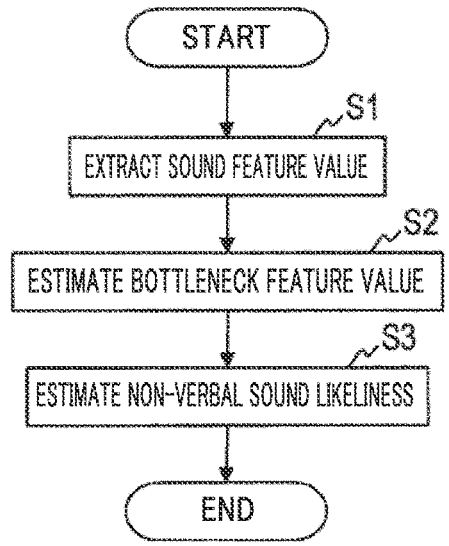
FIG. 2 is a diagram exemplifying a processing sequence of a non-verbal sound detection method.

The following embodiments are a non-verbal sound detection device and method for obtaining a posterior probability of a non-verbal sound likeliness from an input sound signal using a model that estimates a non-verbal sound learned in advance (hereinafter referred to as a "non-verbal sound model"). A non-verbal sound detection device 1 according to the embodiment includes an acoustic model storage unit 10A, a non-verbal sound model storage unit 10B, a sound feature value extraction unit 11, a bottleneck feature value estimation unit 12, and a non-verbal sound detection unit 13, as exemplified in FIG. 1. The non-verbal sound detection device 1 performs processing of each step exemplified in FIG. 2 to realize a non-verbal sound detection method according to the embodiment.

The non-verbal sound detection device 1 is, for example, a special device configured by causing a known or dedicated computer that includes a central processing unit (CPU) and a random access memory (RAM) to read a special program. For example, the non-verbal sound detection device 1 performs all processing under the control of the central processing unit. Data input to the non-verbal sound detection device 1 or data obtained in the processing is stored in, for example, the random access memory. The data stored in the random access memory is read by the central processing unit to be used in other processing as necessary. At least a part of each processing unit of the non-verbal sound detection device 1 may be configured by hardware such as an integrated circuit.

The acoustic model storage unit 10A stores an acoustic model learned in advance. The acoustic model is configured by a deep neural network (DNN) in which a sound feature value is input and a phoneme state number (senone) is output. The deep neural network is assumed to have a bottleneck structure in which the number of units is suppressed to a small number in one layer of intermediate layers. Here, the intermediate layer in which the number of units is suppressed is referred to as a "bottleneck layer" and an output value of the bottleneck layer is referred to as a "bottleneck feature value."

The bottleneck feature value is a feature value that is resistant to acoustic distortion in which an input feature value is dimensionally compressed. The "feature value that is resistant to acoustic distortion" indicates that two feature values generated from an input sound to which two different acoustic distortions are added are similar, for example, when the two different acoustic distortions are assumed to be added to the same input sound. In other words, the "feature value that is resistant to acoustic distortion" is a feature value in which an influence of acoustic distortion is reduced.

Learning an acoustic model is performed in advance based on a large amount of sound data for learning acoustic model and transcribed data in which pieces of sound data are paired. At this time, the sound data for learning acoustic mode is assumed to include a large amount of non-verbal sounds.

The non-verbal sound model storage unit 10B stores a non-verbal sound model learned in advance. The non-verbal sound model is a model in which a sound feature value of each frame and a bottleneck feature value corresponding to the sound feature value of the frame are input and a posterior probability of a non-verbal sound likeliness is output. The "bottleneck feature value corresponding to the sound feature value" is a bottleneck feature value that is output by a bottleneck layer when a certain sound feature value is input to the above-described acoustic model.

In the embodiment, in the non-verbal sound likeliness, a range is assumed to be equal to or greater than 0.0 and equal to or less than 1.0. For the non-verbal sound likeliness, a sound spoken through a human oral cavity with no linguistic meaning (for example, including a cough, a sneeze, laughter, and an artificial sound) is assumed to provide a value close to 1.0. Conversely, a sound with a linguistic meaning and a non-vocal sound (for example, noise of a vehicle or noise such as the sound of feet climbing stairs) is assumed to provide a value close to 0.0.

As the non-verbal sound model, for example, a deep neural network (DNN), a convolutional neural network (CNN), a Gaussian mixture model (GMM), or the like can be used. Here, the non-verbal sound model is preferably a model capable of perceiving (treating) a long-distance context such as a long short term memory (LSTM) or a gated recurrent unit (GRU) on the assumption that a non-verbal sound likeliness is determined depending on content before and after a sound.

The non-verbal sound model learns as follows. Learning data in which a sound feature value of each frame extracted from non-verbal sound model learning sound data, a bottleneck feature value corresponding to the sound feature value of each frame, and a correct answer value of non-verbal sound likeliness are associated is prepared in advance. The correct answer value of the non-verbal sound likeliness is assumed to be manually given as a binary value of 1.0 in the case of a non-verbal sound likeliness and 0.0 in other cases. Based on a result of comparison between an estimated value of an output (a posterior probability of the non-verbal sound likeliness) when learning data is input to a neural network in which an initial value is appropriately set and a correct answer value of the non-verbal sound likeliness in the learning data, each parameter of a neural network is repeatedly updated so that the estimated value is close to the correct answer value. As an updating method, for example, a known technology such as error propagation learning may be used.

In step S1, the sound feature value extraction unit 11 receives a sound signal input to the non-verbal sound detection device 1. The sound feature value extraction unit 11 extracts a sound feature value of each frame from the received sound signal. The extracted sound feature value is, for example, a Mel filter bank slope (MFS) or Mel frequency cepstral coefficients (MFCC) described in Reference Document 1 below. The sound feature value extraction unit 11 inputs the extracted sound feature value of each frame to the bottleneck feature value estimation unit 12 and the non-verbal sound detection unit 13.

[Reference Literature 1] S. R. Madikeri, H. A. Murthy, "Mel Filter Bank energy-based Slope feature and its application to speaker recognition," 2011 National Conference on Communications (NCC), pp. 1 to 4, 2011.

The processing is performed for each frame for the following reasons. When an input sound is acoustically analyzed, an analysis target waveform is assumed to have a constant property (characteristics of the analysis target do not change between initial and final stages) in many cases. Therefore, by cutting an analysis target sound waveform at very short time intervals (a value of 20 to 30 milliseconds is adopted in many cases), the sound is said to have the same characteristics in the very short times. When a sound is cut at short time intervals in this way, the cut sound waveforms partially overlap and portions of common sounds occur to that extent by shifting the cut positions at a width shorter than a time width in order to avoid an abrupt change in an acoustic analysis result (continuously change the acoustic analysis result). A time width at which the cut positions of the frame are shifted is referred to as a frame shift in many cases (a value of 10 to 15 milliseconds is adopted in many cases). For details, refer to NPL 3 above (in particular, FIG. 1).

In step S2, the bottleneck feature value estimation unit 12 receives the sound feature value of each frame from the sound feature value extraction unit 11. The bottleneck feature value estimation unit 12 inputs the received sound feature value of each frame to the acoustic model stored in the acoustic model storage unit 10A and obtains an output vector of the bottleneck layer of the acoustic model as a bottleneck feature value of each frame. The bottleneck feature value estimation unit 12 inputs the obtained bottleneck feature value of each frame to the non-verbal sound detection unit 13.

In step S3, the non-verbal sound detection unit 13 receives the sound feature value of each frame from the sound feature value extraction unit 11 and receives the bottleneck feature value of each frame from the bottleneck feature value estimation unit 12. The non-verbal sound detection unit 13 inputs the received sound feature value of each frame and the received bottleneck feature value of each frame to the non-verbal sound model stored in the non-verbal sound model storage unit 10B and obtains the posterior probability of the non-verbal sound likeliness of each frame output by the non-verbal sound model. The non-verbal sound detection unit 13 outputs the obtained posterior probability of the non-verbal sound likeliness as an output of the non-verbal sound detection device 1.

As described in the above-described embodiment, the following advantages can be expected when the bottleneck feature value in the phoneme state output by the acoustic model is used in detection of a non-verbal sound. First, an improvement in detection precision can be expected when phoneme information of a non-verbal sound is used to perform estimation. Second, by using a model ascertaining a relation between previous and subsequent feature values, a non-verbal sound can be easily estimated using a sound which is the same result as the result obtained using text. That is, according to the non-verbal sound detection technology of the embodiment, information of sound content can be used in detection of a non-verbal sound and detection precision of the non-verbal sound is improved.

An embodiment of the present invention has been described above, but a specific configuration is not limited to the embodiment and it is needless to say that the specific configuration is included in the present invention although design is appropriately changed within the scope of the present invention without departing from the gist of the present invention. The various steps of processing described in the embodiment may not only be performed chronologically in the described order, but the various steps of processing may also be performed in parallel or separately as necessary or depending on a processing capability of a device that performs the processing.

Program and Recording Medium

When various processing functions of each device described in the foregoing embodiment are realized by a computer, processing content of the functions of each device is described by a program. By causing the computer to execute the program, the various steps of processing in each device are realized on the computer.

The program in which the processing content is described can be recorded on a computer-readable recording medium. The computer-readable recording medium may be, for example, any medium such as a magnetic recording device, an optical disc, a magneto-optical recording medium, or a semiconductor memory.

The program may be distributed, for example, by selling, transferring, or lending a portable recording medium such as a DVD or a CD-ROM on which the program is recorded. Further, the program may be distributed by storing the program in a storage device of a server computer and transmitting the program from the server computer to another computer via a network.

For example, a computer that executes the program first temporarily stores a program recorded on a portable recording medium or the program transmitted from a server computer in its own storage device. When the computer performs a process, the computer reads the program stored in its own storage device and performs processing in accordance with the read program. As another embodiment of the program, the computer may directly read a program from a portable recording medium and perform processing in accordance with the program. Further, whenever a program is transmitted from a server computer, the computer may perform processing in order in accordance with the transmitted program. A configuration that performs the above-described processing without performing the transmission of the program from the server computer to the computer may be formed by a so-called application service provider (ASP) type service that realizes a processing function in response to only an execution instruction and result acquisition. The program according to the embodiment is assumed to include information (for example, data that has a property to regulate processing of a computer although the data is not a direct instruction for the computer) which is equivalent to a program and is provided for processing of a computer.

In the embodiment, the device is configured by executing a predetermined program on a computer, but at least a part of the processing content may be realized by hardware.

REFERENCE SIGNS LIST

1 Non-verbal sound detection device
10A Acoustic model storage unit
10B Non-verbal sound model storage unit
11 Sound feature value extraction unit
12 Bottleneck feature value estimation unit
13 Non-verbal sound detection unit

The invention claimed is:

1. A non-verbal sound detection device comprising a processor configured to execute a method comprising:
    storing an acoustic model, wherein the acoustic model includes a deep neural network with a bottleneck structure, and the acoustic model estimates a phoneme state from a sound feature value;
    storing a non-verbal sound model, wherein the non-verbal sound model estimates a posterior probability of a non-verbal sound likeliness from a sound feature value and a bottleneck feature value;
    extracting a sound feature value of a frame from an input sound signal;
    estimating, based on the extracted input sound feature value of the frame from the input sound signal, a bottleneck feature value of the frame using the acoustic model, wherein the bottleneck feature value of the frame includes a value associated with a bottleneck layer of the bottleneck structure of the acoustic model as the acoustic model estimates an output phoneme state from the extracted input sound feature value; and
    determining, based on a combination including the extracted input sound feature value of the frame and the estimated bottleneck feature value of the frame, an output posterior probability of a non-verbal sound likeliness of the frame using the non-verbal sound model.

2. The non-verbal sound detection device according to claim 1, wherein the non-verbal sound model includes a recurrent neural network treating a long-distance context.

3. The non-verbal sound detection device according to claim 1, wherein the non-verbal sound model models a non-verbal sound, and wherein the non-verbal sound includes at least one of a cough, a sneeze, a breathing sound during a telephone conversation, or laughter.

4. The non-verbal sound detection device according to claim 1, wherein the sound feature value includes one or more of a Mel filter bank slope (MFS) or Mel frequency cepstral coefficients (MFCC).

5. The non-verbal sound detection device according to claim 1, wherein the non-verbal sound likeliness of the frame includes a first group and a second group, wherein the first group includes a sound generated through a human oral cavity with no linguistic meaning, and wherein the second group includes a sound with a linguistic meaning and one or more ambient sounds.

6. The non-verbal sound detection device according to claim 5, wherein the first group includes one or more of: a cough, a sneeze, laughter, or an artificial sound.

7. The non-verbal sound detection device according to claim 5, wherein the second group includes one or more of: noise of a vehicle or a sound of feet climbing stairs.

8. A non-verbal sound detection method comprising:
storing an acoustic model, wherein the acoustic model includes a deep neural network with a bottleneck structure, and the acoustic model estimates a phoneme state from sound feature value;
storing, a non-verbal sound model, wherein the non-verbal sound model estimates a posterior probability of a non-verbal sound likeliness from a sound feature value and a bottleneck feature value;
extracting a sound feature value of a frame from an input sound signal;
estimating, based on the extracted input sound feature value of the frame from the input sound signal, a bottleneck feature value of the frame using the acoustic model, wherein the bottleneck feature value of the frame includes a value associated with a bottleneck layer of the bottleneck structure of the acoustic model as the acoustic model estimates an output phoneme state from the extracted input sound feature value; and
determining, based on the extracted input sound feature value of the frame and the estimated bottleneck feature value of the frame, an output posterior probability of a non-verbal sound likeliness of the frame using the non-verbal sound model.

9. The non-verbal sound detection method according to claim 8, wherein the non-verbal sound model includes a recurrent neural network treating a long-distance context.

10. The non-verbal sound detection method according to claim 8, wherein the non-verbal sound model models a non-verbal sound, and wherein the non-verbal sound includes at least one of a cough, a sneeze, a breathing sound during a telephone conversation, or laughter.

11. The non-verbal sound detection method according to claim 8, wherein the sound feature value includes one or more of a Mel filter bank slope (MFS) or Mel frequency cepstral coefficients (MFCC).

12. The non-verbal sound detection method according to claim 8, wherein the non-verbal sound likeliness of the frame includes a first group and a second group, wherein the first group includes a sound generated through a human oral cavity with no linguistic meaning, and wherein the second group includes a sound with a linguistic meaning and one or more ambient sounds.

13. The non-verbal sound detection method according to claim 12, wherein the first group includes one or more of: a cough, a sneeze, laughter, or an artificial sound.

14. The non-verbal sound detection method according to claim 12, wherein the second group includes one or more of: noise of a vehicle or a sound of feet climbing stairs.

15. A computer-readable non-transitory recording medium storing a computer-executable program instructions that when executed by a processor cause a computer system to:
storing an acoustic model, wherein the acoustic model includes a deep neural network with a bottleneck structure, and the acoustic model estimates a phoneme state from a sound feature value;
storing a non-verbal sound model, wherein the non-verbal sound model estimates a posterior probability of a non-verbal sound likeliness from a sound feature value and a bottleneck feature value;
extract, a sound feature value et a sound feature value of a frame from an input sound signal;
estimating, based on the extracted input sound feature value of the frame from the input sound signal, a bottleneck feature value of the frame using the acoustic model, wherein the bottleneck feature value of the frame includes a value associated with a bottleneck layer of the bottleneck structure of the acoustic model as the acoustic model estimates an output phoneme state from the extracted input sound feature value; and
determining, based on the extracted input sound feature value of the frame and the estimated bottleneck feature value of the frame, an output posterior probability of a non-verbal sound likeliness of the frame using the non-verbal sound model.

16. The computer-readable non-transitory recording medium according to claim 15, wherein the non-verbal sound model includes by a recurrent neural network treating a long-distance context.

17. The computer-readable non-transitory recording medium according to claim 15, wherein the non-verbal sound model models a non-verbal sound, and wherein the non-verbal sound includes at least one of a cough, a sneeze, a breathing sound during a telephone conversation, or laughter.

18. The computer-readable non-transitory recording medium according to claim 15, wherein the sound feature value includes one or more of a Mel filter bank slope (MFS) or Mel frequency cepstral coefficients (MFCC).

19. The computer-readable non-transitory recording medium according to claim 15, wherein the non-verbal sound likeliness of the frame includes a first group and a second group, wherein the first group includes a sound generated through a human oral cavity with no linguistic meaning, and wherein the second group includes a sound with a linguistic meaning and one or more ambient sounds.

20. The computer-readable non-transitory recording medium according to claim 19, wherein the first group includes one or more of: a cough, a sneeze, laughter, or an artificial sound, and wherein the second group includes one or more of: noise of a vehicle or a sound of feet climbing stairs.

* * * * *